(12) United States Patent
Tomioka et al.

(10) Patent No.: US 9,386,291 B2
(45) Date of Patent: Jul. 5, 2016

(54) VIDEO SIGNAL PROCESSING DEVICE

(71) Applicant: PANASONIC CORPORATION, Osaka (JP)

(72) Inventors: Shinichi Tomioka, Osaka (JP); Atsuhisa Kageyama, Osaka (JP); Hiroshi Taniuchi, Hyogo (JP); Shirou Yoshioka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 279 days.

(21) Appl. No.: 14/201,251

(22) Filed: Mar. 7, 2014

(65) Prior Publication Data

US 2014/0184738 A1     Jul. 3, 2014

Related U.S. Application Data

(63) Continuation of application No. PCT/JP2012/003195, filed on May 16, 2012.

(30) Foreign Application Priority Data

Oct. 14, 2011    (JP) .................................. 2011-227041

(51) Int. Cl.
*H04N 15/00*      (2006.01)
*H04N 5/765*      (2006.01)
(Continued)

(52) U.S. Cl.
CPC ....... *H04N 13/0007* (2013.01); *H04N 13/0018* (2013.01); *H04N 13/0033* (2013.01); *H04N 13/026* (2013.01); *H04N 2013/0081* (2013.01)

(58) Field of Classification Search
CPC .......... H04N 13/0007; H04N 13/0018; H04N 13/0033; H04N 13/026
USPC ........... 348/42, 46, 51, 47; 386/200, 210, 232
See application file for complete search history.

(56) References Cited

U.S. PATENT DOCUMENTS 6,445,833 B1    9/2002   Murata et al.
8,508,580 B2 *   8/2013   McNamer .......... H04N 13/0221
                                                   348/43

(Continued)

FOREIGN PATENT DOCUMENTS

JP    10-051811 A    2/1998
JP    11-127456 A    5/1999

(Continued)

OTHER PUBLICATIONS

International Search Report issued in International Application No. PCT/JP2012/003195 mailed Jun. 12, 2012, with English translation, 5 pgs.

*Primary Examiner* — Robert Chevalier
(74) *Attorney, Agent, or Firm* — McDermott Will & Emery LLP

(57) ABSTRACT

In order to obtain an optimum depth enhancement effect for three-dimensional (3D) images, a depth information extractor configured to compute depth information from an input video signal, a 2D/3D converter configured to convert, when the input video signal is a two-dimensional (2D) video signal, the 2D video signal to a first video signal which is a 3D video signal based on the depth information, a correction factor calculator configured to compute a correction factor based on the depth information, a selector configured to select either the input video signal or the first video signal and output the selected signal, and a contour enhancement processor configured to perform an enhancement process on the output of the selector based on the correction factor and output the enhanced signal as an output video signal are provided.

16 Claims, 10 Drawing Sheets

(51) Int. Cl.
*H04N 13/00* (2006.01)
*H04N 13/02* (2006.01)

(56) References Cited

U.S. PATENT DOCUMENTS

| | | |
|---|---|---|
| 2007/0262985 A1 | 11/2007 | Watanabe et al. |
| 2010/0315488 A1 | 12/2010 | Kim et al. |
| 2012/0051625 A1* | 3/2012 | Appia .................. G06T 7/0059 382/154 |
| 2012/0257816 A1* | 10/2012 | Witt .................. H04N 13/0007 382/154 |

FOREIGN PATENT DOCUMENTS

| | | |
|---|---|---|
| JP | 2007-264722 A | 10/2007 |
| JP | 2007-329902 A | 12/2007 |
| JP | 2008-021163 A | 1/2008 |
| JP | 2011-004396 A | 1/2011 |

\* cited by examiner

VIDEO SIGNAL PROCESSING DEVICE

CROSS-REFERENCE TO RELATED APPLICATIONS

This is a continuation of International Application No. PCT/JP2012/003195 filed on May 16, 2012, which claims priority to Japanese Patent Application No. 2011-227041 filed on Oct. 14, 2011. The entire disclosures of these applications are incorporated by reference herein.

BACKGROUND

The present disclosure relates to video signal processing devices, and specifically to contour enhancement techniques using depth information.

There is a conventional technique of extracting depth information from an original image to sharpen contours on a near side and blur contours on a back side in the original image, thereby obtaining a stereoscopic two-dimensional (2D) image (see Japanese Unexamined Patent Publication No. 2007-264722).

There is another conventional technique of determining a correction amount for contour enhancement based on depth distribution, thereby achieving optimum depth enhancement of 2D images (see Japanese Unexamined Patent Publication No. 2008-21163).

SUMMARY

When the conventional technique is simply applied to a three-dimensional (3D) image, depth information is extracted from each of a left-eye (L) image and a right-eye (R) image. Thus, consistency between the depth information from the L image and the depth information from the R image is not ensured, so that it is not possible to acquire impression of a correct depth. Moreover, it is not possible to ensure consistency between the depth of the 3D image and depth information for the contour enhancement.

It is an object of the present disclosure to provide a video signal processing device capable of obtaining an optimum depth enhancement effect for 3D images.

To achieve the object, in the present disclosure, for example, depth information generated by 2D/3D conversion is used in 2D/3D depth enhancement to sharpen contours on a near side and blur contours on a back side in an image, thereby obtaining a stereoscopic 3D image.

Specifically, a video signal processing device according to the present disclosure includes: a depth information extractor configured to compute depth information from an input video signal; a 2D/3D converter configured to convert, when the input video signal is a 2D video signal, the 2D video signal to a first video signal serving as a 3D video signal based on the depth information; a correction factor calculator configured to compute a correction factor based on the depth information; a selector configured to select the input video signal or the first video signal and output the selected signal; and an enhancement processor configured to perform an enhancement process on the output of the selector based on the correction factor and output the enhanced signal as an output video signal.

According to the present disclosure, depth information is generated from an image before 2D/3D conversion, and the depth information is applied to the 2D/3D conversion and to a contour enhancement process performed on a 3D image, so that it is possible to obtain an optimum depth enhancement effect for the 3D image.

DETAILED DESCRIPTION

Embodiments of the present disclosure will be described in detail below based on the drawings.

Figure 1:
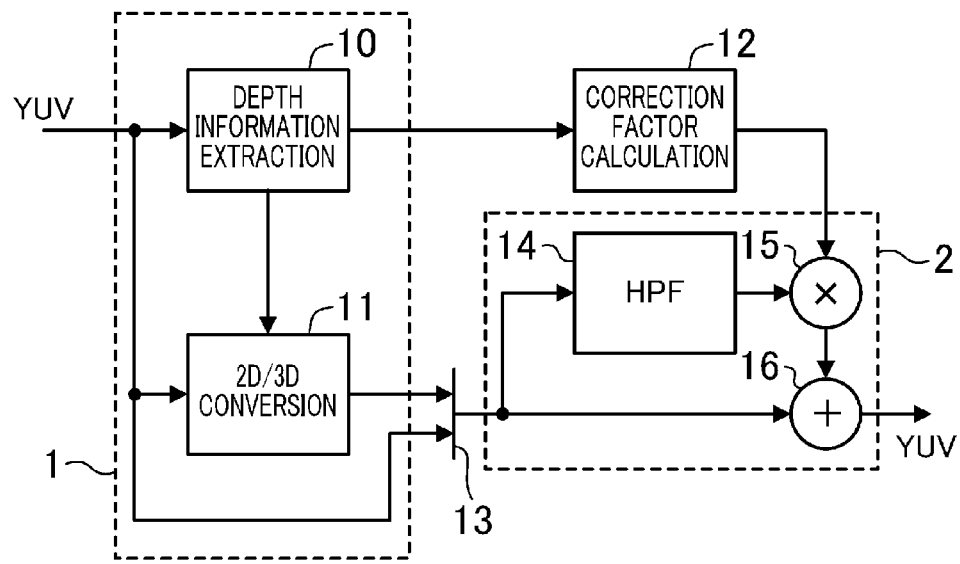
FIG. 1 is a block diagram illustrating an example configuration of a video signal processing device according to the present disclosure.

FIG. 1 shows an example configuration of a video signal processing device according to the present disclosure. The video signal processing device of FIG. 1 includes a depth information extractor 10, a 2D/3D converter 11, a correction factor calculator 12, a selector 13, a high pass filter (HPF) 14, a multiplier 15, and an adder 16. The video signal processing device is capable of receiving both 2D and 3D video signals as input video signals (YUV signals). The depth information extractor 10 and the 2D/3D converter 11 form an extraction converter 1. The HPF 14, the multiplier 15, and the adder 16 form a contour enhancement processor 2.

The depth information extractor 10 computes depth information from an input video signal (a 2D video signal or a 3D video signal). When the input video signal is a 2D video signal, the 2D/3D converter 11 converts the 2D video signal to a 3D video signal based on the depth information from the depth information extractor 10. Methods for the conversion are well known, and thus description thereof will be omitted. The correction factor calculator 12 computes a correction factor based on the depth information from the depth information extractor 10. The selector 13 selects either the input video signal or the 3D video signal output from the 2D/3D converter 11, and outputs the selected signal. The depth information extractor 10 in the extraction converter 1 is used in common for 2D and 3D video signals, which can reduce the area of the extraction converter 1.

The contour enhancement processor 2 performs an enhancement process on the output from the selector 13 based on the correction factor, and outputs the enhanced signal as an output video signal (a YUV signal). More specifically, the HPF 14 extracts contour information from a 2D video signal or a 3D video signal. Based on the correction factor obtained in the correction factor calculator 12, the multiplier 15 corrects the contour information obtained in the HPF 14. The adder 16 adds an output from the multiplier 15 to the output from the selector 13.

Figure 2:
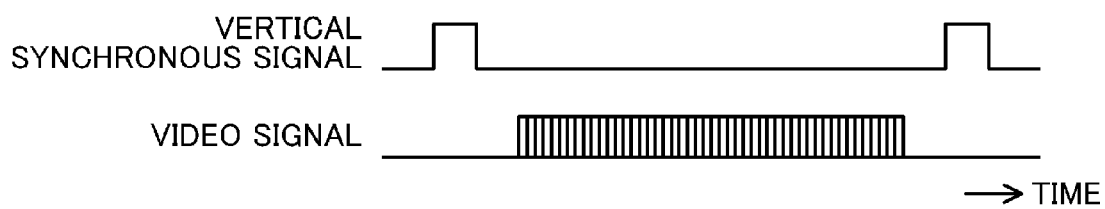
FIG. 2 is a timing diagram illustrating an example waveform of an input signal in the video signal processing device of FIG. 1, where the input signal is a 2D video signal.

FIG. 2 shows an example waveform of an input signal in the video signal processing device of FIG. 1, where the input signal is a 2D video signal. The 2D video signal is included in each of periods of a vertical synchronous signal.

Figure 3:
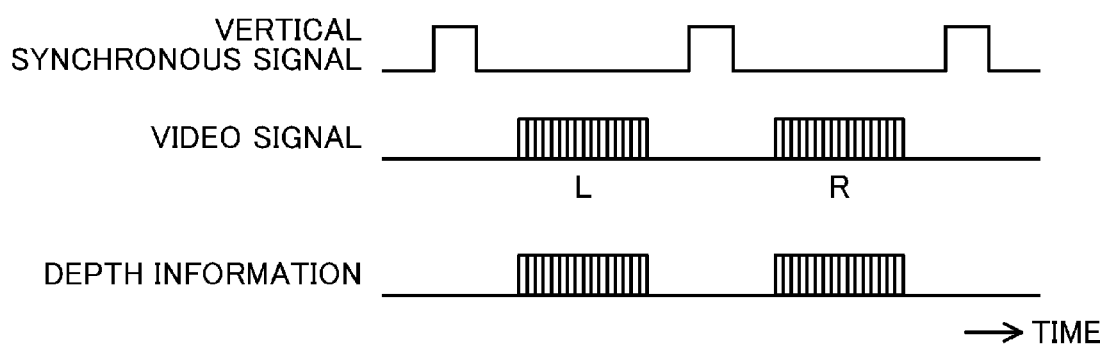
FIG. 3 is a timing diagram illustrating examples of a 3D video signal obtained by converting the 2D video signal in the video signal processing device of FIG. 1 and depth information extracted from the 2D video signal before the conversion.

FIG. 3 shows examples of a 3D video signal obtained from the 2D video signal by operating the 2D/3D converter 11 in the video signal processing device of FIG. 1 and depth information extracted from the 2D video signal before the conversion by the 2D/3D converter 11. The selector 13 selects the 3D video signal obtained in the 2D/3D converter 11. An L image and an R image forming the 3D video signal are alternately displayed. In this case, the depth information obtained from the 2D video signal is used to perform contour correction on the video signal after the 3D conversion, thereby obtaining a stereoscopic 3D image.

Figure 4:
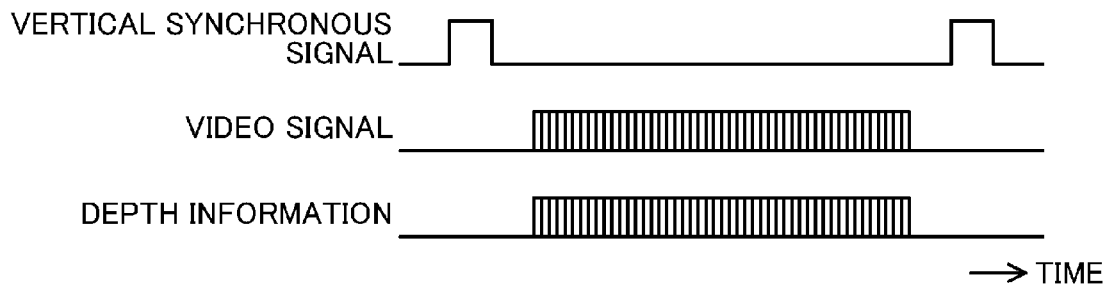
FIG. 4 is a timing diagram illustrating an example waveform of an input signal in the case where the input signal is a 2D signal and 2D/3D conversion is not executed in the video signal processing device of FIG. 1, and an example depth information extracted from the 2D video signal.

FIG. 4 shows an example waveform of an input signal in the case where both the input signal and an output signal are 2D video signals and the 2D/3D converter 11 is not operated in the video signal processing device of FIG. 1, and example depth information extracted from the 2D video signal. The selector 13 selects the 2D video signal which is the input video signal. In this case, 2D/3D conversion is not performed, but contour enhancement is performed by using the depth information, thereby obtaining a stereoscopic 2D image.

Figure 5:
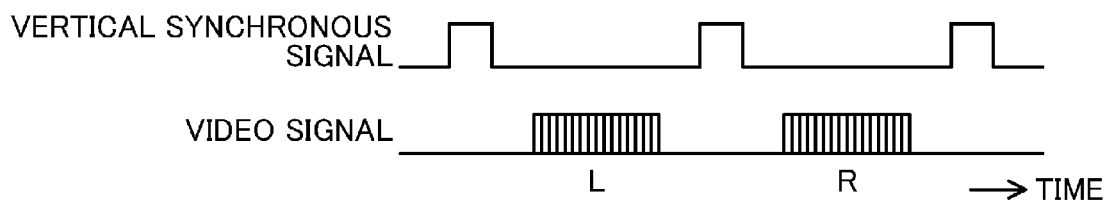
FIG. 5 is a timing diagram illustrating an example waveform of an input signal in the case where the input signal is a 3D video signal in the video signal processing device of FIG. 1.

FIG. 5 shows an example waveform of an input signal in the case where both the input signal and an output signal are 3D video signals and the 2D/3D converter 11 is not operated in the video signal processing device of FIG. 1. The repetition frequency of a vertical synchronous signal is two times as frequent as that of FIG. 2, and L/R images alternately appear in the video signal. The depth information extractor 10 is capable of extracting depth information from the characteristics of the 3D video signal independently of the depth of the 3D image. Alternatively, the depth information extractor 10 is capable of extracting depth information from each of the L/R images forming the input video signal. Based on the depth information extracted from the 3D video signal, the contour correction is performed, thereby obtaining a stereoscopic 3D image.

Figure 6:
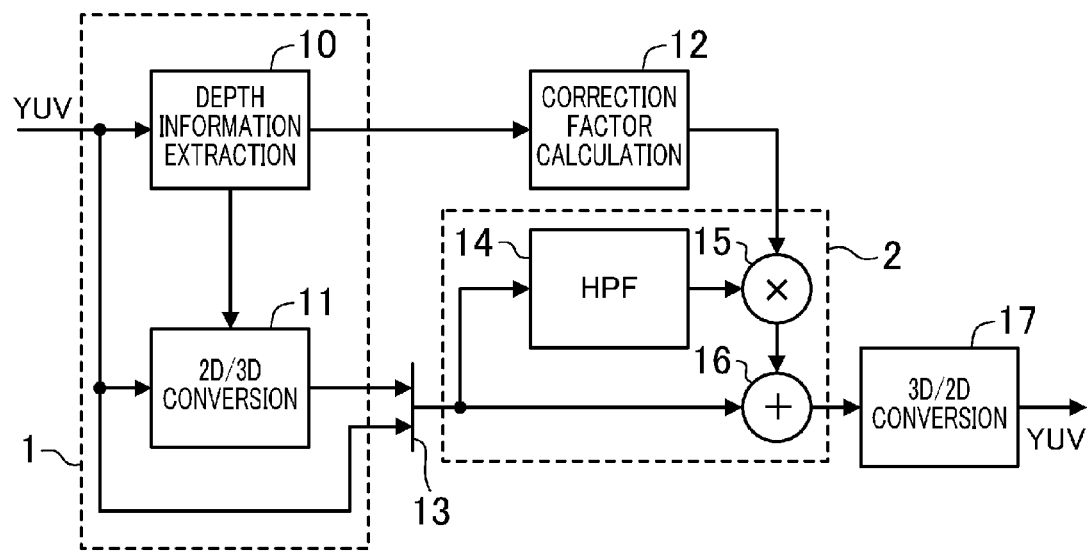
FIG. 6 is a block diagram illustrating a variation of the video signal processing device of FIG. 1.

FIG. 6 shows a variation of the video signal processing device of FIG. 1. In FIG. 6, a 3D/2D converter 17 configured to receive an output from the contour enhancement processor 2 is added to the configuration of FIG. 1. With this configuration, the contour correction is performed based on depth information extracted from the 3D video signal, and then 3D/2D conversion is performed, thereby obtaining a stereoscopic image. A contour enhancement effect is adjusted based on the correct depth information obtained from the 3D video signal, so that it is possible to obtain a higher-precision effect. The 3D/2D converter 17 may have, for example, a configuration in which only the L image is output and the R image is abandoned.

Figure 7:
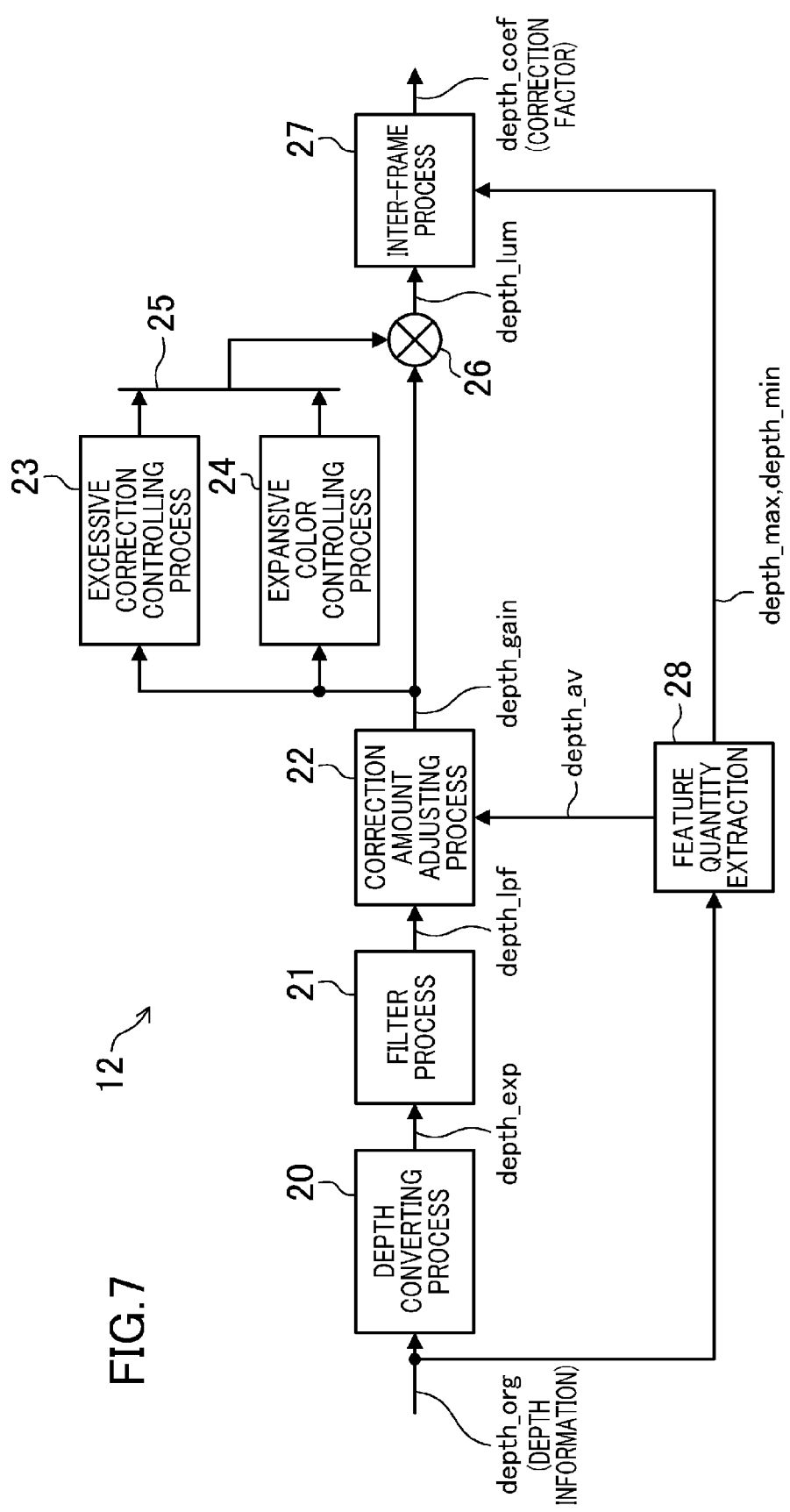
FIG. 7 is a block diagram illustrating a detailed example configuration of the correction factor calculator of FIG. 1.

FIG. 7 shows a detailed example configuration of the correction factor calculator 12 of FIG. 1. The correction factor calculator 12 of FIG. 7 includes a depth converting processor 20, a filter processor 21, a correction amount adjusting processor 22, an excessive correction controlling processor 23, an expansive color controlling processor 24, a selector 25, a multiplier 26, an inter-frame processor 27, and a feature quantity extractor 28. In the following description, depth information input from the depth information extractor 10 to the correction factor calculator 12 is denoted by depth_org, output depth information of the depth converting processor 20 is denoted by depth_exp, output depth information of the filter processor 21 is denoted by depth_lpf, output depth information of the correction amount adjusting processor 22 is denoted by depth_gain, output depth information of the multiplier 26 is denoted by depth_lum, a correction factor which is output depth information of the inter-frame processor 27 is denoted by depth_coef, a depth average value is denoted by depth_av, a depth maximum value is denoted by depth_max, and a depth minimum value is denoted by depth_min The depth average value depth_av, the depth maximum value depth_max, and the depth minimum value depth_min are feature quantities of the depth information depth_org, for example, in one frame.

Figure 8:
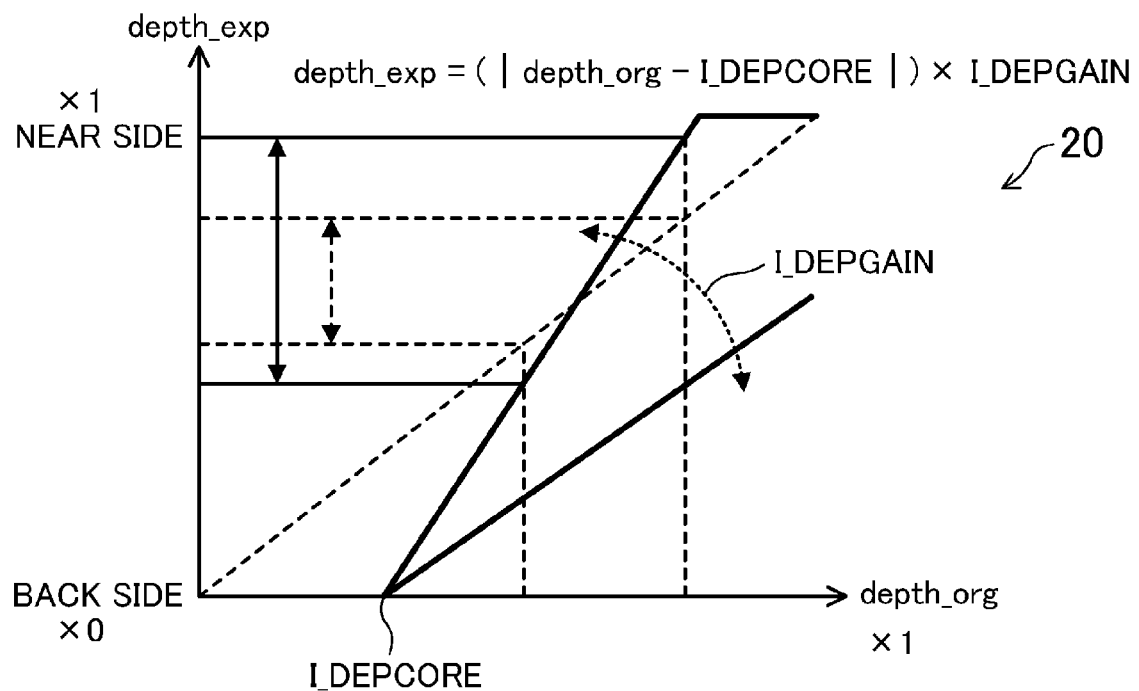
FIG. 8 is a view illustrating the function of the depth converting processor of FIG. 7.

The function of each of blocks in FIG. 7 will be described in detail below. FIG. 8 is a view illustrating the function of the depth converting processor 20 of FIG. 7. When the depth information depth_org input from the depth information extractor 10 is used as it is, there is a possibility that a contour enhancement effect is not appropriately adjusted. Therefore, contour enhancement is performed based on the depth information depth_exp obtained after expansion of the dynamic range. The calculation formula is: depth_exp=(Idepth_org− I_DEPCOREI)×I_DEPGAIN where each of I_DEPCORE and I_DEPGAIN is a constant. The depth converting processor 20 performs a depth converting process in which the difference between an upper limit and a lower limit of the depth information is increased.

Figure 9:
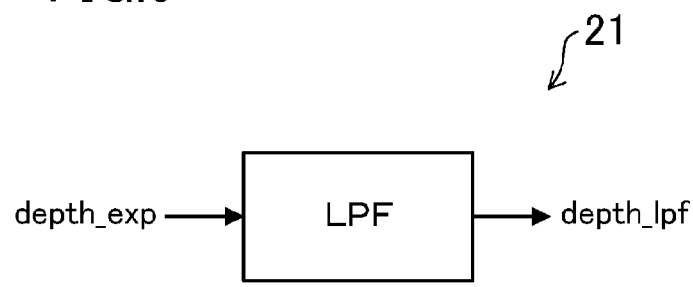
FIG. 9 is a view illustrating the function of the filter processor of FIG. 7.

FIG. 9 is a view illustrating the function of the filter processor 21 of FIG. 7. When the change of a depth enhancement effect becomes steep on a depth border, a pseudo contour appears, which may results in an unnatural image. Therefore, the filter processor 21 performs a smoothing filter process by a low pass filter (LPF) on the depth information depth_exp after the expansion of the dynamic range. Note that the depth converting processor 20 may be omitted, and the smoothing filter may be applied to the depth information depth_org input from the depth information extractor 10.

Figure 10:
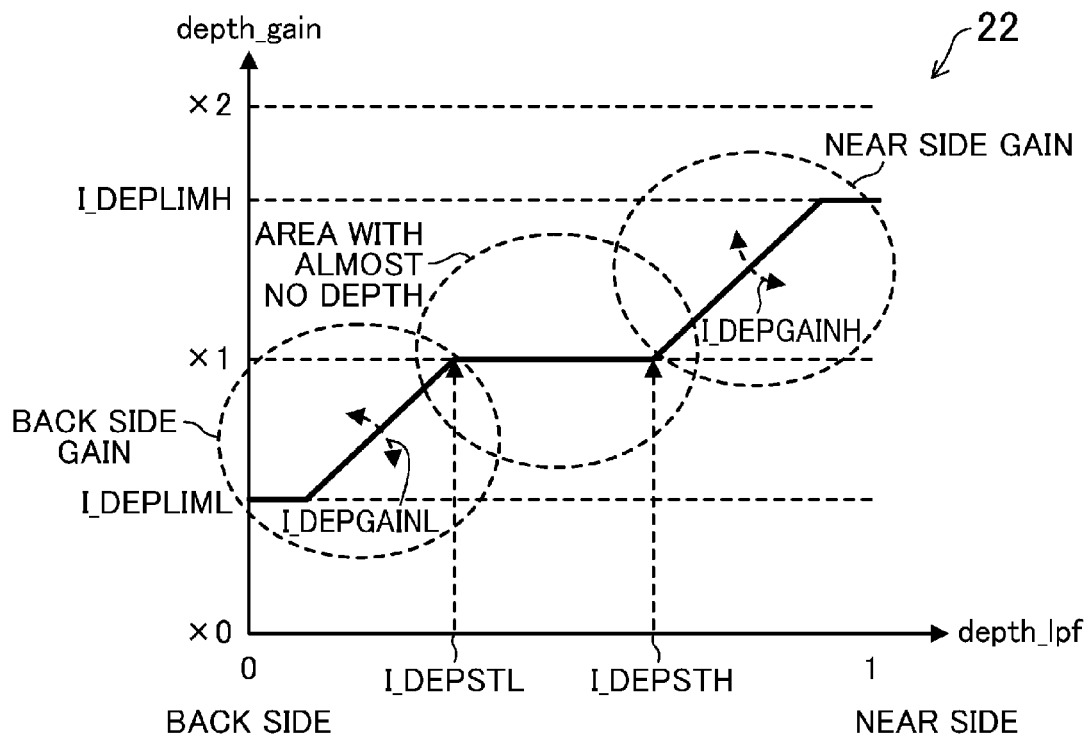
FIG. 10 is a view illustrating the function of the correction amount adjusting processor of FIG. 7.

FIG. 10 is a view illustrating the function of the correction amount adjusting processor 22 of FIG. 7. The correction amount adjusting processor 22 performs, on the depth information depth_lpf after the application of the smoothing filter, correction amount adjustment in which when the value of the depth information depth_lpf is greater than a first depth value I_DEPSTL and less than a second depth value I_DEPSTH, the value of the depth information depth_lpf is converted to a third depth value which is a constant value. In FIG. 10, I_DEPGAINH and I_DEPLIMH are constants relating to a near side gain, I_DEPGAINL and I_DEPLIML are constants relating to a back side gain. The depth information depth_gain obtained in the correction amount adjusting processor 22 corresponds to a gain for performing image quality adjustment. Note that the depth converting processor 20 and the filter processor 21 may be omitted, and the correction amount adjusting processor 22 may perform the correction amount adjustment on the depth information depth_org input from the depth information extractor 10. Alternatively, only the filter processor 21 may be omitted, and the correction amount adjusting processor 22 may perform the correction amount adjustment on the depth information depth_exp after the depth converting process.

Figure 11:
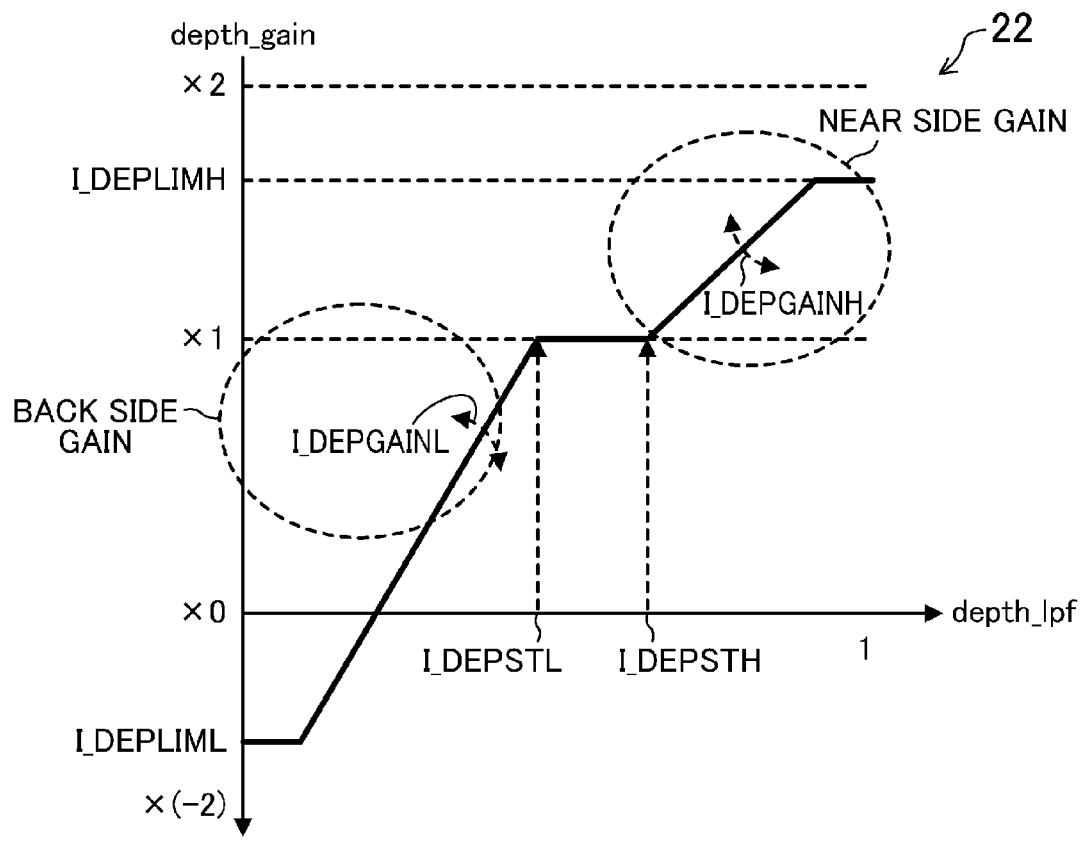
FIG. 11 is a view illustrating another function of the correction amount adjusting processor of FIG. 7.

FIG. 11 is a view illustrating another function of the correction amount adjusting processor 22 of FIG. 7. The correction amount adjusting processor 22 performs, on the depth information depth_lpf after the application of the smoothing filter, correction amount adjustment in which when the value of the depth information depth_lpf is less than a fourth depth value less than the first depth value I_DEPSTL, the value of the depth information depth_lpf is converted to a negative depth value. When the depth information depth_gain representing a gain is negative, an output of a high pass filter (HPF) is inverted and blurred, thereby further enhancing a stereoscopic effect. Moreover, since switching from a HPF to a LPF is linearly performed in a HPF-inverting LPF, it is possible to create a natural image.

Figure 12:
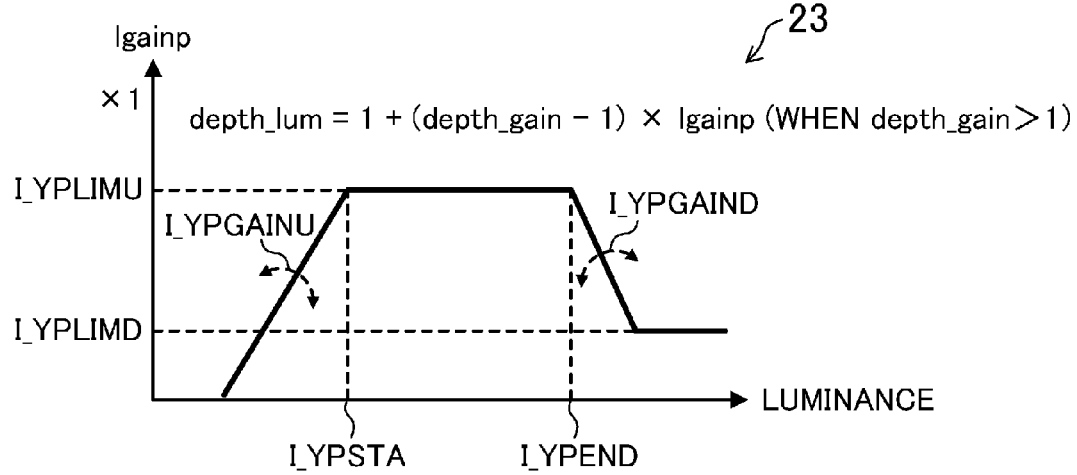
FIG. 12 is a view illustrating the function of the excessive correction controlling processor of FIG. 7.

FIG. 12 is a view illustrating the function of the excessive correction controlling processor 23 of FIG. 7. The excessive correction controlling processor 23 performs, on depth information depth_gain after the correction amount adjustment, an excessive correction controlling process in which when the luminance of an input video signal is less than or equal to a first luminance value I_YPSTA or greater than or equal to a second luminance value I_YPEND, the value of the depth information is reduced. The vertical axis in FIG. 12 indicates a gain lgainp, and each of I_YPGAINU, I_YPGAIND, I_YPLIMU, and I_YPLIMD is a constant.

Figure 13:
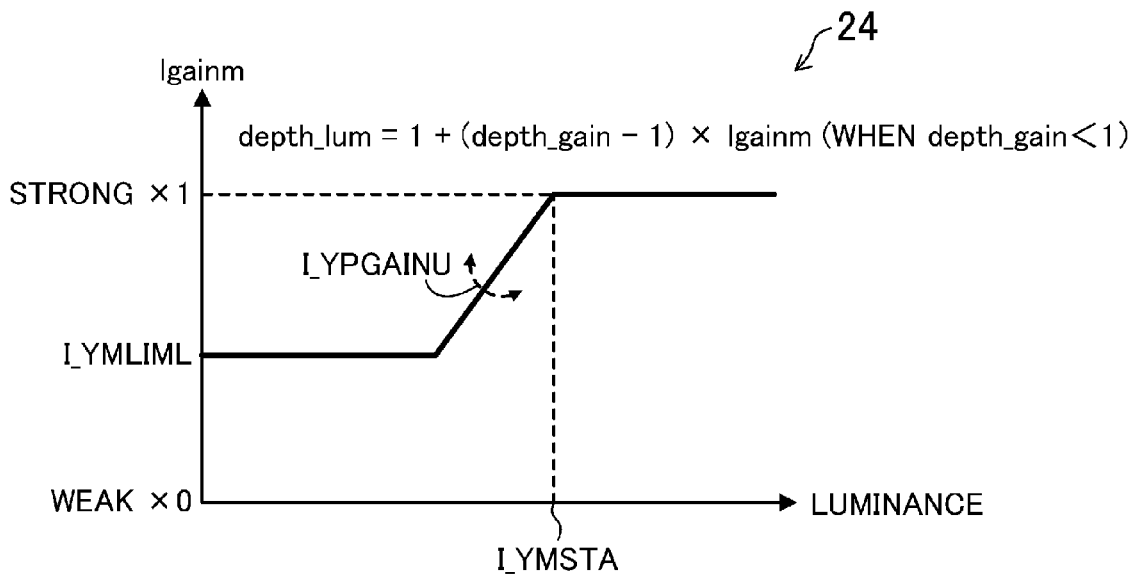
FIG. 13 is a view illustrating the function of the expansive color controlling processor of FIG. 7.

FIG. 13 is a view illustrating the function of the expansive color controlling processor 24 of FIG. 7. The expansive color controlling processor 24 performs, on the depth information depth_gain after the correction amount adjustment, an expansive color controlling process in which when the luminance of an input video signal is greater than or equal to a third luminance value I_YMSTA, the value of the depth information is reduced. The vertical axis in FIG. 13 indicates a gain lgainm, and each of I_YPGAINU and I_YMLIML is a constant.

In FIG. 7, the selector 25 supplies either an output of the excessive correction controlling processor 23 or an output of the expansive color controlling processor 24 to the multiplier 26. The multiplier 26 multiplies the depth information depth_gain which is an output of the correction amount adjusting processor 22 by the gain lgainp or the lgainm which is the output of the selector 25, thereby generating the depth information depth_lum. The calculation formula in the case where depth_gain>1 is:

$$depth\_lum = 1 + (depth\_gain - 1) \times lgainp, \text{ and}$$

the calculation formula in the case where depth_gain<1 is:

$$depth\_lum = 1 + (depth\_gain - 1) \times lgainm.$$

The excessive correction controlling processor 23 processes a correction component greater than one time the gain based on the contour and luminance information, thereby controlling excessive correction. This can reduce noise enhancement at low luminance, reduce halation at high luminance, and adjust the amount of enhancement appropriately to details/contours. Note that, the depth converting processor 20, the filter processor 21, and the correction amount adjusting processor 22 may be omitted, and the excessive correction controlling processor 23 may perform excessive correction control on the depth information depth_org input from the depth information extractor 10. Alternatively, the filter processor 21 and the correction amount adjusting processor 22 may be omitted, and the excessive correction controlling processor 23 may perform the excessive correction control on the depth information depth_exp after the depth converting process. Alternatively, only the correction amount adjusting processor 22 may be omitted, and the excessive correction controlling processor 23 may perform the excessive correction control on the depth information depth_lpf after the application of the smoothing filter.

The expansive color controlling processor 24 strongly controls the depth enhancement effect on white and yellow in order to reduce flamboyance of an image of an expansive color. Note that, the depth converting processor 20, the filter processor 21, and the correction amount adjusting processor 22 may be omitted, and the expansive color controlling processor 24 may perform expansive color control on the depth information depth_org input from the depth information extractor 10. Alternatively, the filter processor 21 and the correction amount adjusting processor 22 may be omitted, and the expansive color controlling processor 24 may perform the expansive color control on the depth information depth_exp after the depth converting process. Alternatively, only the correction amount adjusting processor 22 may be omitted, and the expansive color controlling processor 24 may perform the expansive color control on the depth information depth_lpf after the application of the smoothing filter.

Figure 14:
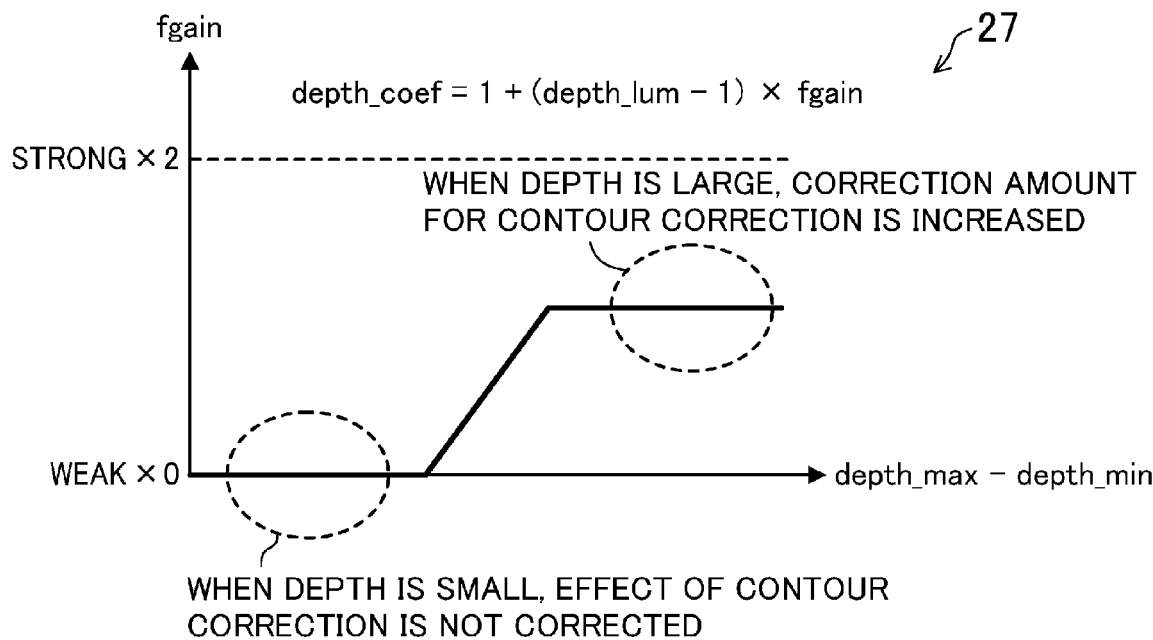
FIG. 14 is a view illustrating the function of the inter-frame processor of FIG. 7.

FIG. 14 is a view illustrating the function of the inter-frame processor 27 of FIG. 7. The inter-frame processor 27 executes, on the depth information depth_lum after the excessive correction controlling process or the expansive color controlling process, contour correction amount adjustment in which when the difference between the minimum value depth_min and the maximum value depth_max of depth information in one frame is large, the contour enhancement is performed, whereas when the difference between the minimum value depth_min and the maximum value depth_max of the depth information in the one frame is small, the contour enhancement is not performed. The calculation formula is:

$$depth\_coef = 1 + (depth\_lum - 1) \times fgain$$

where fgain is the gain.

When the dynamic range of the depth information is large, the adjustment amount of the effect on the contour correction is increased, so that it is possible to further enhance a stereoscopic effect of a stereoscopic image. Note that the depth converting processor 20, the filter processor 21, the correction amount adjusting processor 22, the excessive correction controlling processor 23, the expansive color controlling processor 24, the selector 25, and the multiplier 26 may be omitted, and the inter-frame processor 27 may perform the contour correction amount adjustment on the depth information depth_org input from the depth information extractor 10. Alternatively, the filter processor 21, the correction amount adjusting processor 22, the excessive correction controlling processor 23, the expansive color controlling processor 24, the selector 25, and the multiplier 26 may be omitted, and the inter-frame processor 27 may perform the contour correction amount adjustment on the depth information depth_exp after the depth converting process. Alternatively, the correction amount adjusting processor 22, the excessive correction controlling processor 23, the expansive color controlling processor 24, the selector 25, and the multiplier 26 may be omitted, and the inter-frame processor 27 may perform the contour correction amount adjustment on the depth information depth_lpf after the application of the smoothing filter. Alternatively, the excessive correction controlling processor 23, the expansive color controlling processor 24, the selector 25, and the multiplier 26 may be omitted, and the inter-frame processor 27 may perform the contour correction amount adjustment on the depth information depth_gain after the correction amount adjustment.

Figure 15:
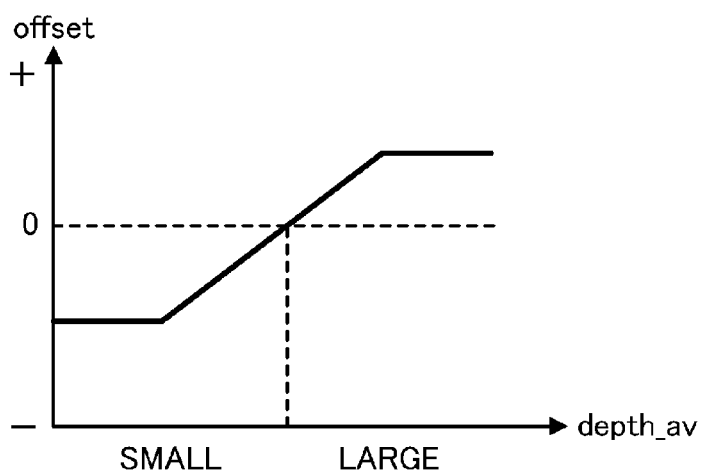
FIG. 15 is a view illustrating the relationship between the depth average value and the offset amount of the correction amount adjusting processor of FIG. 7.

FIG. 15 is a view illustrating the relationship between the depth average value depth_av and an offset amount offset in the correction amount adjusting processor 22 of FIG. 7. When the depth average value depth_av in one frame is small, a negative offset amount offset is used. In contrast, when the depth average value depth_av in one frame is large, a positive offset amount offset is used.

The correction amount adjusting processor 22 dynamically changes I_DEPSTL and I_DEPSTH in a correction amount adjustment process based on the depth average value depth_av such that when the depth average value depth_av is small, the conversion curve of the correction amount adjustment illustrated in FIG. 10 is moved to a less input value, and when the depth average value depth_av is large, the conversion curve of the correction amount adjustment illustrated in FIG. 10 is moved to a greater input value. This provides the impression of depth of an image even when the depth is concentrated on the near side or the back side.

Figure 16:
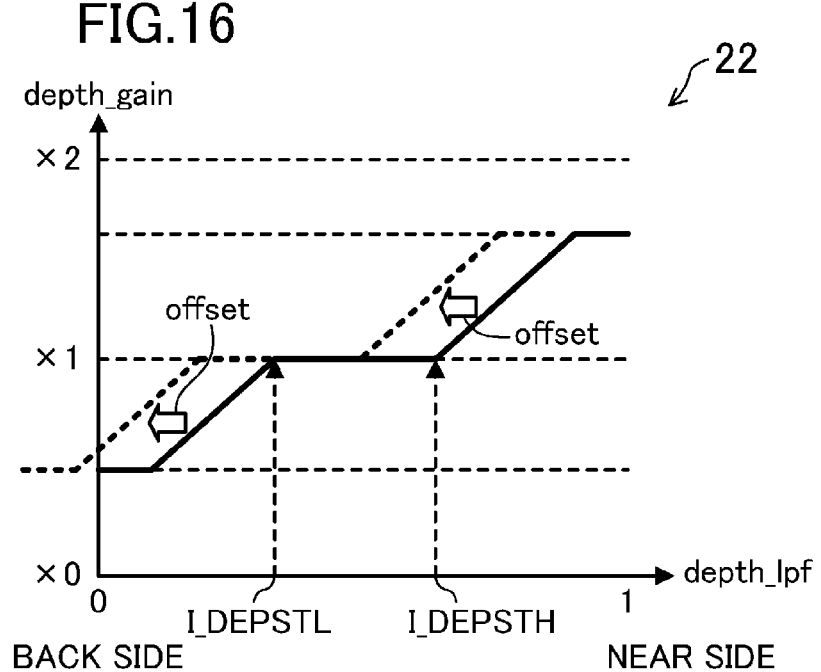
FIG. 16 is a view illustrating feature adjustment in the correction amount adjusting processor of FIG. 7 in the case where the depth average value is small.

FIG. 16 is a view illustrating feature adjustment in the correction amount adjusting processor 22 of FIG. 7 in the case where the depth average value depth_av is small. As a result of using the negative offset amount offset according to FIG. 15, the characteristic curve illustrated in FIG. 10 is shifted to the left.

Figure 17:
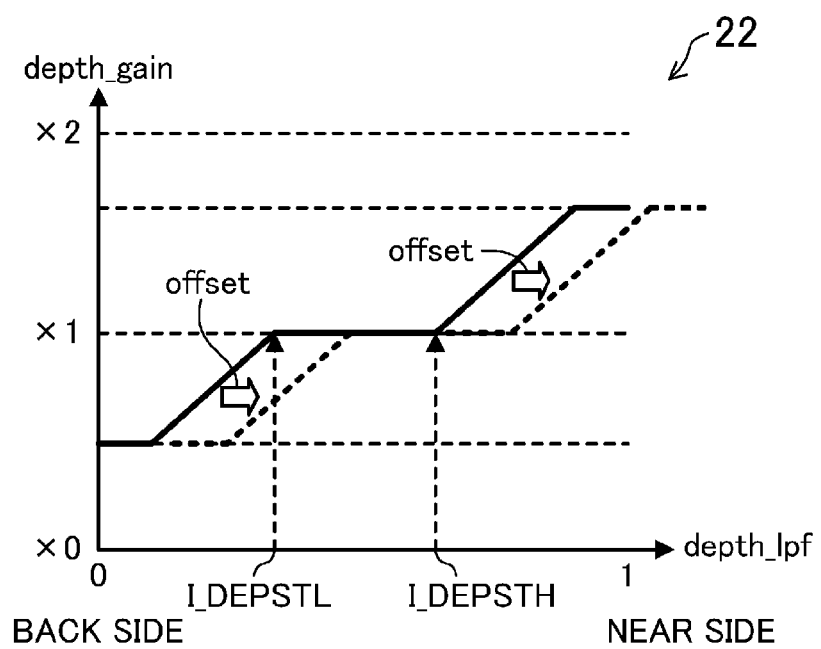
FIG. 17 is a view illustrating feature adjustment in the correction amount adjusting processor of FIG. 7 in the case where the depth average value is large.

FIG. 17 is a view illustrating the feature adjustment in the correction amount adjusting processor 22 of FIG. 7 in the case where the depth average value depth_av is large. As a result of using the positive offset amount offset according to FIG. 15, the characteristic curve illustrated in FIG. 10 is shifted to the right.

Figure 18:
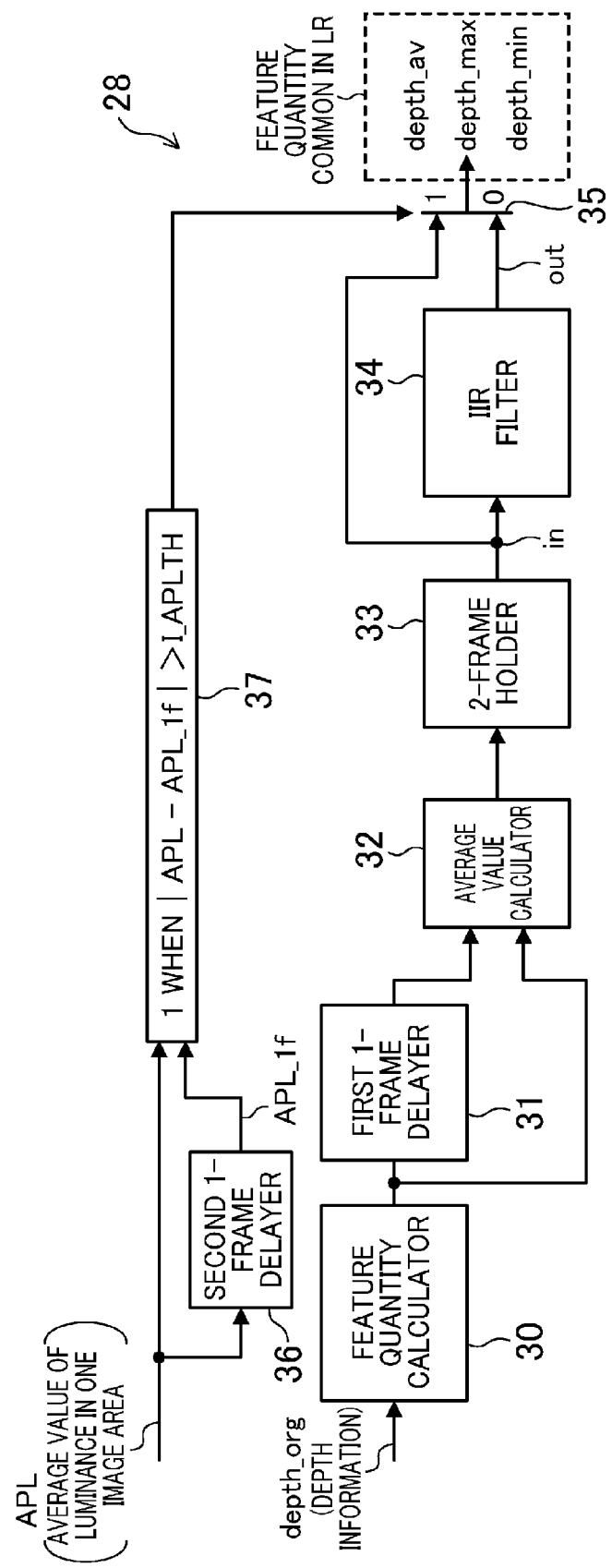
FIG. 18 is a block diagram illustrating a detailed example configuration of the feature quantity extractor of FIG. 7.

FIG. 18 shows a detailed example configuration of the feature quantity extractor 28 in FIG. 7. The feature quantity extractor 28 of FIG. 18 includes a feature quantity calculator 30, a first 1-frame delayer 31, an average value calculator 32, a 2-frame holder 33, an infinite-duration impulse response (IIR) filter 34, a selector 35, a second 1-frame delayer 36, and a determination section 37. The determination section 37 receives a luminance average value APL in one image area and a value APL_1f obtained by delaying the luminance average value APL by one frame, and outputs "1" when an absolute value of the difference between the luminance average value APL and the value APL_1f is greater than a threshold value I_APLTH, and otherwise outputs "0" to the selector 35. The selector 35 selects a filter input in when the output of the determination section 37 is "1," and a filter output out when the output of the determination section 37 is "0," and outputs, as a feature quantity common in the L image and the R image, the depth average value depth_av, the depth maximum value depth_max, and the depth minimum value depth_min in one frame.

Figure 19:
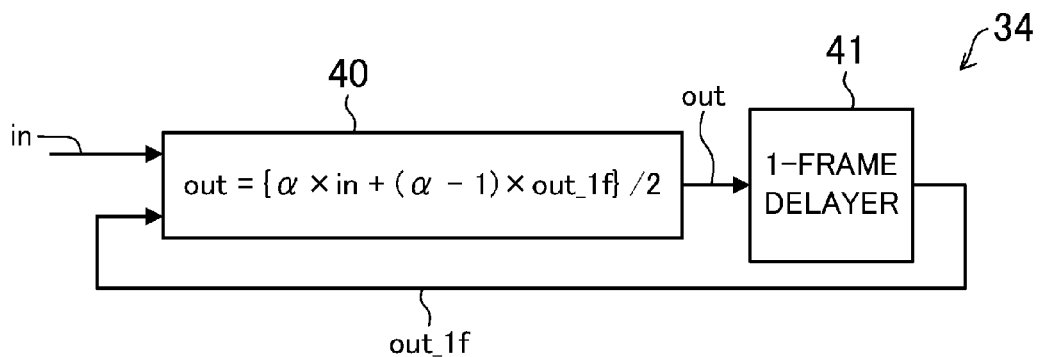
FIG. 19 is a block diagram illustrating a detailed example configuration of the IIR filter of FIG. 18.

FIG. 19 shows a detailed example configuration of the IIR filter 34 of FIG. 18. The IIR filter 34 of FIG. 19 includes an operator 40 and a 1-frame delayer 41. The operator 40 receives a filter input in and a result out_1f obtained by delaying the filter output out by one frame, and performs weighing addition of the filter input in and the result out_1f using a coefficient $\alpha$, thereby obtaining a filter output out.

Figure 20:
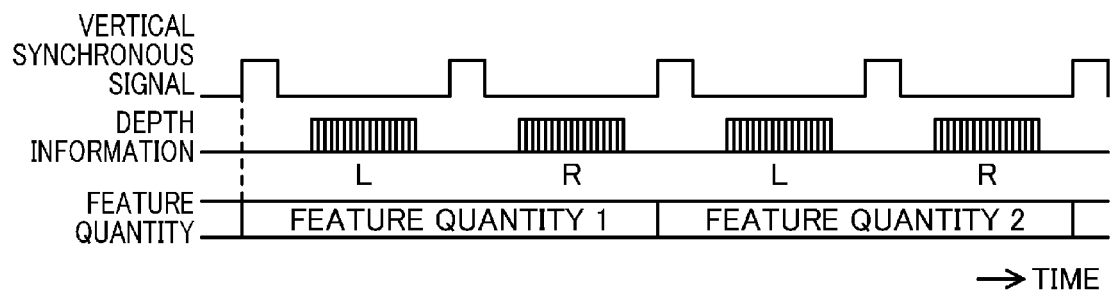
FIG. 20 is a timing diagram illustrating the function of the feature quantity extractor of FIG. 18.

FIG. 20 is a timing diagram illustrating the function of the feature quantity extractor 28 of FIG. 18. When the output video signal of the video signal processing device of FIG. 1 is a 3D video signal, an L image and an R image are synthesized, and the same value is used as the feature quantity such as the average value depth_av, the maximum value depth_max, and the minimum value depth_min of the depth information for the L image and the R image.

According to the configuration of FIG. 18, applying the IIR filter to the feature quantities reduces variation in feature quantities, so that flickers can be reduced. In the example of FIG. 18, when the occurrence of a scene change is detected by, for example, a large differential value of the luminance average value APL in one image area, the IIR filter 34 is bypassed, but the occurrence of the scene change may be detected based on information other than the luminance.

As described above, the video signal processing device according to the present disclosure is useful because an optimum depth enhancement effect for 3D images can be obtained.

What is claimed is:

1. A video signal processing device comprising:
a depth information extractor configured to compute depth information from an input video signal;
a two dimension-to-three dimension converter configured to convert, when the input video signal is a two-dimensional video signal, the two-dimensional video signal to a first video signal which is a three-dimensional video signal based on the depth information;
a correction factor calculator configured to compute a correction factor based on the depth information;
a selector configured to select the input video signal or the first video signal and output the selected signal; and
an enhancement processor configured to perform an enhancement process on the output of the selector based on the correction factor and output the enhanced signal as an output video signal.

2. The video signal processing device of claim 1, wherein when the input video signal is a two-dimensional video signal, the selector selects the first video signal, and the output video signal is a three-dimensional video image.

3. The video signal processing device of claim 1, wherein when the input video signal is a two-dimensional video signal, the selector selects the input video signal, and the output video signal is a two-dimensional video image.

4. The video signal processing device of claim 1, wherein when the input video signal is a three-dimensional video signal, the selector selects the input video signal, and the output video signal is a three-dimensional video image.

5. The video signal processing device of claim 4, wherein when the input video signal is a three-dimensional video signal, the depth information extractor extracts depth information from signals of two left and right images of the input video signal.

6. The video signal processing device of claim 1, wherein when the input video signal is a three-dimensional video signal, the selector selects the input video signal, and the video signal processing device further comprises a three dimension-to-two dimension converter configured to generate a second two-dimensional video signal from the output video signal.

7. The video signal processing device of claim 1, wherein the correction factor calculator performs a depth converting process in which a difference between an upper limit and a lower limit of the depth information is increased.

8. The video signal processing device of claim 7, wherein the correction factor calculator applies a smoothing filter to either the depth information or depth information after the depth converting process.

9. The video signal processing device of claim 8, wherein the correction factor calculator performs, on one of the depth information, the depth information after the depth converting process, or depth information after the application of the smoothing filter, correction amount adjustment in which when a value of the one depth information is greater than a first depth value and less than a second depth value, the value of the one depth information is converted to a third depth value which is a constant value.

10. The video signal processing device of claim 8, wherein the correction factor calculator performs, on one of the depth information, the depth information after the depth converting process, or depth information after the application of the smoothing filter, correction amount adjustment in which when a value of the one depth information is less than a fourth depth value less than a first depth value, the value of the one depth information is converted to a negative depth value.

11. The video signal processing device of claim 9, wherein the correction factor calculator performs, on one of the depth information, the depth information after the depth converting process, the depth information after the application of the smoothing filter, or depth information after the correction amount adjustment, an excessive correction controlling process in which when a luminance of the input video signal is less than or equal to a first luminance value or greater than or equal to a second luminance value, the value of the one depth information is reduced.

12. The video signal processing device of claim 9, wherein the correction factor calculator performs, on one of the depth information, the depth information after the depth converting process, the depth information after the application of the smoothing filter, or depth information after the correction amount adjustment, an expansive color controlling process in which when a luminance of the input video signal is greater than or equal to a third luminance value, a value of the one depth information is reduced.

13. The video signal processing device of claim 11, wherein
the correction factor calculator performs, on one of the depth information, the depth information after the depth converting process, the depth information after the application of the smoothing filter, the depth information after the correction amount adjustment, or depth information after the excessive correction controlling process, contour correction amount adjustment in which when a difference between a minimum value and a maximum value of the depth information in one frame is large, contour enhancement is performed, whereas when the difference between the minimum value and the maximum value of the one depth information in the one frame is small, the contour enhancement is not performed.

14. The video signal processing device of claim 12, wherein
the correction factor calculator performs, on one of the depth information, the depth information after the depth converting process, the depth information after the application of the smoothing filter, the depth information after the correction amount adjustment, or depth information after the expansive color controlling process, contour correction amount adjustment in which when a difference between a minimum value and a maximum value of the one depth information in one frame is large, contour enhancement is performed, whereas when the difference between the minimum value and the maximum value of the one depth information in the one frame is small, the contour enhancement is not performed.

15. The video signal processing device of claim 9, wherein the correction factor calculator moves a conversion curve of the correction amount adjustment to a less input value when a depth average value is small, whereas the correction factor calculator moves the conversion curve of the correction amount adjustment to a greater input value when the depth average value is large.

16. The video signal processing device of claim 1, wherein when the output video signal is a three-dimensional video signal, a same value is used as a feature quantity such as an average value, a maximum value, and a minimum value of the depth information for a left image and for a right image.

* * * * *